April 20, 1965     E. O. NINNEMAN     3,179,237
APPARATUS FOR CLOSING PLASTIC BOTTLES
Filed Nov. 29, 1962     2 Sheets-Sheet 1
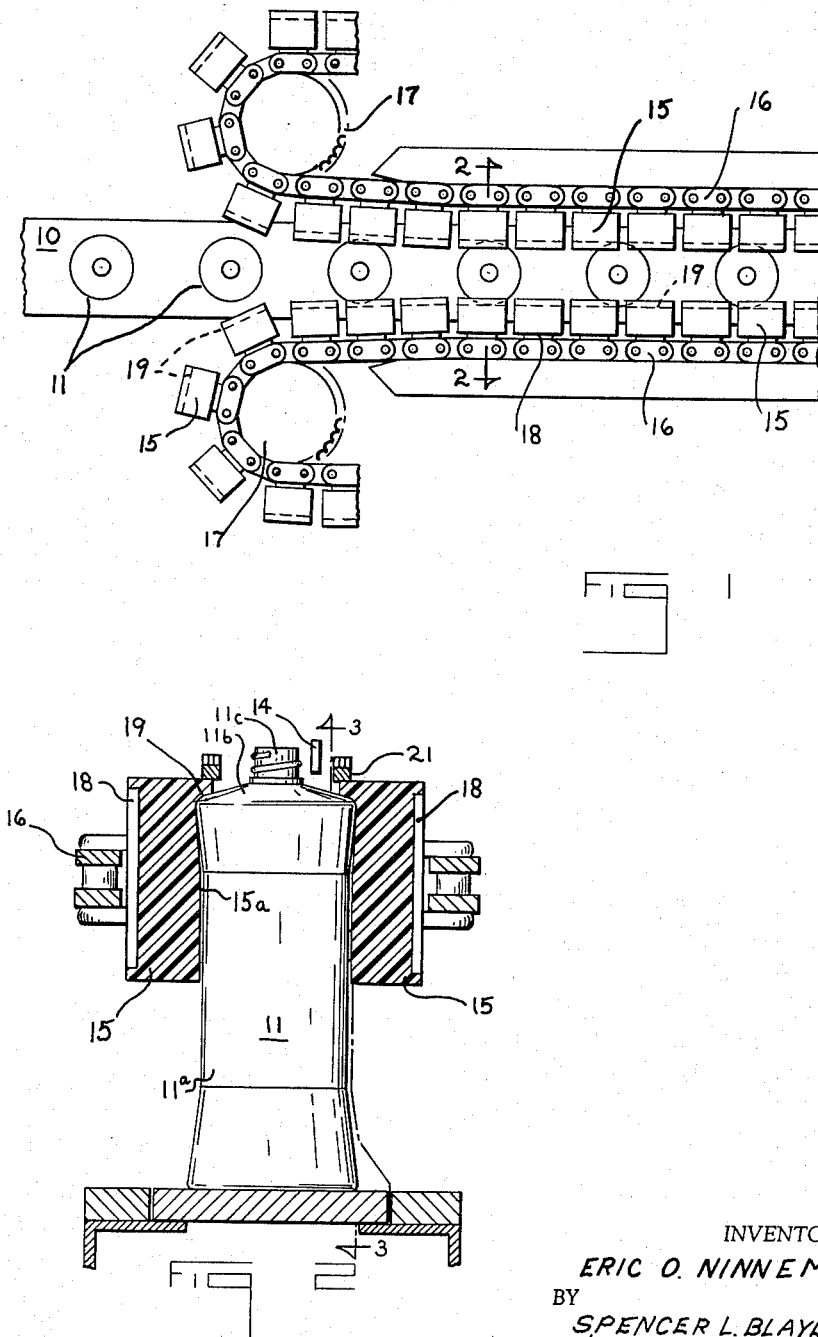
INVENTOR.
ERIC O. NINNEMAN
BY
SPENCER L. BLAYLOCK JR
& W. A. SCHAICH
ATTORNEYS April 20, 1965 E. O. NINNEMAN 3,179,237
APPARATUS FOR CLOSING PLASTIC BOTTLES
Filed Nov. 29, 1962 2 Sheets-Sheet 2
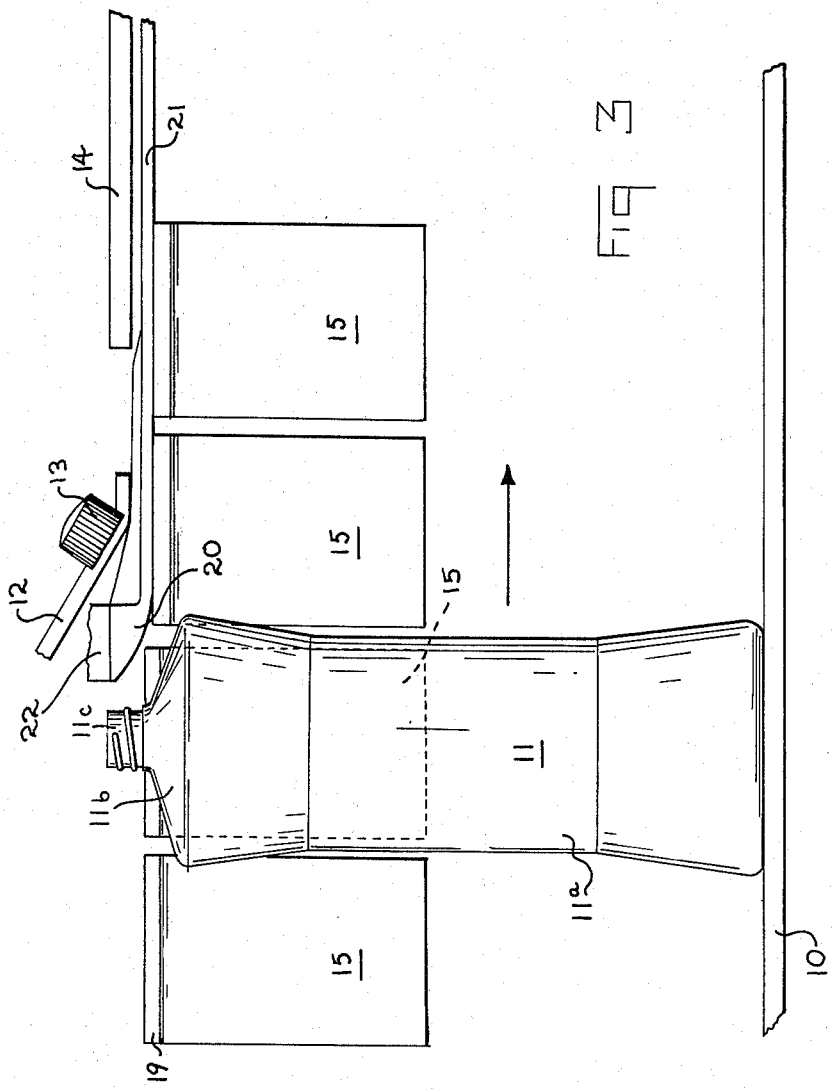
INVENTOR.
ERIC O. NINNEMAN
BY SPENCER L. BLAYLOCK, JR.
& W. A. SCHAICH
ATTORNEYS

United States Patent Office 3,179,237
Patented Apr. 20, 1965

3,179,237
APPARATUS FOR CLOSING PLASTIC BOTTLES
Eric O. Ninneman, Toledo, Ohio, assignor to Owens-Illinois Glass Company, a corporation of Ohio
Filed Nov. 29, 1962, Ser. No. 240,819
6 Claims. (Cl. 198—165)

My invention relates to improvements in apparatus for closing bottles and the like containers and more especially is concerned with the capping or sealing of semi-rigid bottles such as those formed of polyethylene or other resinous material having similar characteristics.

It is impractical to use conventional closing apparatus designed for capping glass bottles in the handling and closing of plastic bottles for the reason that such apparatus in its most generally accepted commercial form utilizes opposed gripper belts which apply substantial holding pressure to the bottle body. Such apparatus is illustrated in Harmon et al. Patent #2,855,736 which is owned by the assignee of the instant application. The application of sufficient pressure to diametrically opposed points of the body of a plastic bottle to hold it against tipping while picking a closure cap from the cap chute and against rotation during cap application, would of necessity collapse the body enough to discharge some of the contents. It is understood that these bottles will have been filled with a liquid product prior to entering the closing apparatus.

Moreover, holding the body partially collapsed during closure cap application may also result in a permanently distorted bottle, in that release of holding pressure will not be followed by return of the body to its original contour due to a partial vacuum existing in the container. The closure cap prevents entry of air into the bottle and it cannot assume its original form.

An important object of my invention, therefore, is the provision of novel, simple effective means for overcoming the above noted deficiencies and to provide bottle holding apparatus which can neither scuff nor otherwise mar the plastic bottle finish.

A further object of my invention is the provision of plastic bottle handling apparatus in which holding pads advance in opposed pairs with each upright filled bottle, such pads being so positioned and moved as to apply firm downward pressure in diametrically opposed areas of the bottle shoulder where it merges with the side wall or body proper. Thus the bottle is in effect tightly squeezed between each pair of pads and the bottle conveyor with the downward pressure applied to an area which I have ascertained offers maximum resistance to deformation under external pressure.

It is also an object of my invention to provide bottle holding or gripping pads which are contoured to firmly engage a peripheral portion of a bottle shoulder and including a depending skirt part which lies closely adjacent but not quite in actual contact with the bottle body.

Finally it is an object of my inveniton to provide cam means for flexing the pads in a fashion to insure positive gripping of the bottles by said pads at the desired time.

Other objects will be in part apparent and in part pointed out hereinafter.

In the accompanying drawings forming a part of my application:

FIGURE 1 is a partial plan view omitting some superstructure and showing particularly the series of container gripping pads.

FIGURE 2 is a sectional elevational view taken along the line 2—2 of FIGURE 1, but including two pad flexing cams and a closure cap rotating bar.

FIGURE 3 is a fragmentary detail elevational view partly in section taken along the plane of line 3—3 of FIGURE 2.

In the illustrated embodiment of my invention it comprises a horizontal main conveyor 10 which is driven continuously by means (not shown) to advance bottles 11 in succession in upright position beneath a closure cap chute 12 where each bottle picks up a cap 13, and then moves on to a zone in which a horizontal friction bar 14 or other suitable device rotates and thereby secures the cap in sealing position on the bottle. In the above-identified Harmon et al. patent is illustrated a commercial closing machine which incorporates mechanism particularly well adapted for use with my invention. The patent disclosure of the conveyor, cap delivery means and container gripping pad driving means are well suited to my apparatus.

As is apparent from the foregoing my invention is particularly concerned with the gripping pads specific design and the mechanism for engaging them with the bottles. It is apparent that the plastic bottles 11 involved are more or less conventional insofar as general contour is concerned, in that each comprises a round body 11a, tapered in part, as shown, or precisely cylindrical, if preferred. The shoulder 11b may be tapered or inclined as shown and lead to a conventional cap accommodating neck 11c. I have ascertained that the peripheral or marginal area of the shoulder where it merges with the body offers the greatest resistance to deformation and accordingly my invention takes full advantage of this fact and concentrates or localizes the pad pressure in this area in such fashion as to firmly positively grip the bottles while moving through the cap pick-up and applying zones, without any appreciable distortion of the bottles.

Accordingly the pads 15 are arranged in two endless series, one at each side of the path of travel of the bottles 11 and each series being carried by sprocket chains 16 which are trained over sprockets 17 and are driven by any suitable conventional means (not shown). Each of these pads 15 may well be a generally rectangular block of cushion material, rubber for example, each pad anchored to a holder 18 or carrier plate which in turn is secured to a sprocket chain 16 or belt. These pads, including the depending skirt 15a which lies quite close to the body of the bottle, of course, need not be precisely rectangular, but, in any event, each embodies a lateral flange 19 or finger at its upper inner margin to snugly take over or engage the peripheral or marginal area of the bottle shoulder 11b. The downward pressure of the finger 19 upon the shoulder 11b is adequate to firmly grip the bottle between it and the main conveyor 10 and support the bottle both against tipping as it picks up its closure cap and bodily rotation as the closure cap is threaded onto the neck 11c. Although careful setting-up of the machine should provide adequate gripping pressure I have positively insured same by arranging a cam and hold-down bar over a part of the path of the working series of pads. The cam 20 (FIG. 3) flexes the fingers 19 downwardly slightly to tightly grasp the bottles just prior to their arrival beneath the closure cap chute 12 and the hold-down bar 21 insures maintenance of such gripping of the bottles until the friction bar 14 has applied the closure caps.

There are two of these cams 20 and hold-down bars 21 (FIGS. 2 and 3) one overlying the working zone of a series of gripping pads and both suspended from the cap chute frame-work (not shown, but see the Harmon et al. patent above-identified) by vertical arms 22. The friction bar 14 which overlies the path of the bottles may well be supported by a frame-work (not shown) thereabove.

Thus it is apparent that my apparatus as described above allows bottles to approach the cap chute in normal fashion but just prior to actual contact with a closure cap, firmly grips the bottles between the main conveyor and gripping or holding pads which concentrate or localize downward pressure at the shoulder periphery and continue same through both the cap pick-up step and the cap-affixing cycle. The bottles thereby are secured against both tipping and rotation, all without distortion or partial collapse.

Modifications may be resorted to within the spirit and scope of the appended claims.

I claim:

1. Apparatus for advancing upright filled plastic bottles seriatim through closure cap pick-up and affixing zones and holding them against tipping and bodily rotation while moving through said zones, comprising, a horizontal conveyor for supporting and advancing the bottles, such bottles each having a radial shoulder portion adjacent a closure-cap accommodating neck, an endless series of gripping pads at each side of and above the horizontal conveyor, means for advancing said pads at the same lineal speeds as the bottles and for positioning said pads to apply top pressure to diametrically opposed peripheral areas of said shoulder portions just prior to and during movement of the bottles through said zones.

2. In apparatus as defined in claim 1 the pads each being formed of a cushion-like resilient material and including a lateral finger to extend over a peripheral area of the bottle shoulder.

3. Apparatus as defined in claim 2 and camming hold-down means applying vertical downward flexing pressure to the pad fingers while in said zones.

4. Apparatus as defined in claim 2, each pad having a depending skirt portion positioned to lie alongside the bottle below said shoulder.

5. Apparatus as defined in claim 1 and camming hold-down means for applying and maintaining vertical downward pressure upon the pads while the bottles engaged thereby are moving through said zones.

6. Apparatus for advancing upright filled plastic bottles seriatim through closure cap pick-up and affixing zones and holding them against tipping and bodily rotation while moving through said zones, comprising a continuous moving horizontal conveyor for supporting shouldered bottles upright and advancing them seriatim to and through closure cap pick-up and affixing zones, an endless series of shoulder gripping pads at each side of and above the conveyor, means for advancing said pads at the same speed as the conveyor and for positioning said pads to apply top pressure to diametrically opposed peripheral areas of said shoulder portions while in said zones.

References Cited by the Examiner
UNITED STATES PATENTS
3,074,533  1/63  Ninneman _____ 198—165

FOREIGN PATENTS
707,905  4/54  Great Britain.

SAMUEL F. COLEMAN, *Acting Primary Examiner.*
WILLIAM B. LA BORDE, ERNEST A. FALLER, Jr.
*Examiners.*